United States Patent [19]

Sandbank

[11] 4,324,336

[45] Apr. 13, 1982

[54] SEPARATING APPARATUS

[75] Inventor: Hans A. Sandbank, London, England

[73] Assignee: Andrex N.D.T. Products (U.K.) Limited, Wembley, England

[21] Appl. No.: 769,053

[22] Filed: Feb. 16, 1977

[30] Foreign Application Priority Data

Mar. 11, 1976 [GB] United Kingdom ............... 9763/76

[51] Int. Cl.$^3$ .............................................. B07C 5/34
[52] U.S. Cl. ................................... 209/589; 209/637; 209/638; 209/657
[58] Field of Search ............... 209/74 R, 74 M, 111.5, 209/576, 589, 606, 638, 637, 656, 657

[56] References Cited

U.S. PATENT DOCUMENTS

| | | | |
|---|---|---|---|
| 3,137,392 | 6/1964 | Slight | 209/111.5 X |
| 3,382,975 | 5/1968 | Hoover | 209/74 R X |
| 3,435,950 | 4/1969 | Suverkrop | 209/74 R X |
| 3,472,375 | 10/1969 | Mathews | 209/74 R |
| 3,565,249 | 2/1971 | Codding | 209/74 M |
| 3,594,579 | 7/1971 | Garrett et al. | 209/111.5 X |

Primary Examiner—Joseph J. Rolla
Attorney, Agent, or Firm—Kirschstein, Kirschstein, Ottinger & Cobrin

[57] ABSTRACT

An apparatus for separating objects of a particular kind from other objects, e.g. stones etc. from potatoes during harvesting, wherein the objects fall in a stream past a detector for objects of said particular kind and, after detection of an object, a separating member positioned downstream of the detector is moved in a manner in dependence on a physical dimension of the detected object so that objects of said particular kind are directed in a first direction and other objects are directed in another direction. The physical dimension may determine a time of movement of the separating member and/or whether the separating member should be moved at all.

11 Claims, 4 Drawing Figures

SEPARATING APPARATUS

This invention relates to apparatus for separating objects of a particular kind from a stream of falling objects.

The invention relates particularly to such apparatus of the kind comprising: sensing means for detecting objects of said particular kind in a stream of falling objects; a separating mechanism including at least one movable separating member which is positioned downstream of the sensing means along the path of the falling objects; and control means arranged to control said separating mechanism in response to the output of the sensing means so that the separating member is so moved with respect to the path of the falling objects after the detection of an object by the sensing means that objects of said particular kind are directed in a first direction and other objects are directed in another direction. Such an apparatus is hereafter referred to as an apparatus of the kind specified.

Such an apparatus finds particular application in separating stones, clods of earth and other unwanted materials from root crops during harvesting.

With apparatus of the kind specified it is difficult to obtain satisfactory operation with objects of widely differing sizes, and/or with a high rate of throughput of objects.

One example of this difficulty arises with root harvesting apparatus of the kind specified wherein the separating member is normally positioned with respect to the falling stream so as to deflect the root crop onto a conveyor or the like, and temporarily moved in response to the detection of a stone etc. by the sensing means to a second position so as to allow the detected stone etc. to fall clear of, or be deflected away from, the conveyor. With such an arrangement it is desirable that the distance which the root crop drops before being deflected by the separating member is small in order to avoid bruising the crop. However, with a small drop distance it is difficult to fix the time for which the separating member should remain in its second position in response to the detection of a stone etc. by the sensing means and the time after detection of a stone etc. at which the separating member should first be moved to its second position so that satisfactory operation is obtained with objects of widely differing sizes.

Another example of this difficulty arises with root harvesting apparatus of the kind specified wherein the sensing means includes a source of radiation, such as X-rays, which directs a beam of radiation onto a sensor, stones etc. being detected by virtue of the fact that they consist of a material which attenuates the radiation more than the material of the root crop. With such an arrangement it is difficult to distinguish between a large root crop object and a small stone etc.

It is an object of the present invention to provide an apparatus of the kind specified wherein this difficulty is overcome.

According to one aspect of the present invention in an apparatus of the kind specified the movement of the separating member after detection of an object by the sensing means is controlled in dependence on a physical dimension of the object detected by the sensing means.

Normally said physical dimension is a dimension in the direction in which the objects fall.

In one particular arrangement in accordance with the invention a time of movement of the separating member after detection of an object by the sensing means is controlled in dependence on said physical dimension.

In one such particular arrangement wherein the separating member is temporarily moved from a first position to a second position after detection of an object by the sensing means, the time for which the separating member remains in its second position is varied in the same sense as said physical dimension.

In another such particular arrangement wherein the separating member is temporarily moved from a first position to a second position after detection of an object by the sensing means, the time which elapses between detection of an object by the sensing means and movement of the separating member to its second position may also be varied in dependence on said physical dimension.

In another particular arrangement in accordance with the invention wherein the sensing means includes a source of radiation arranged to direct a beam of said radiation onto a sensor, which beam is interrupted by the falling objects, the objects of said particular kind being detected because they consist of material which attenuates the radiation differently from the material of the other objects, movement of said separating member after detection of an object by the sensing means is controlled in dependence on said physical dimension of that object in conjunction with the strength of the radiation received by the sensor when that object interrupts the beam.

In one such arrangement, the separating member is moved only when the strength of the radiation received by the sensor has a predetermined relation with respect to a threshold value, which threshold value depends in turn on said physical dimension.

According to a second aspect of the invention there is provided a method of separating objects of a particular kind from a stream of falling objects comprising: detecting objects of said particular kind in said stream, and after detection of an object, moving a separating member positioned along the path of the falling objects, downstream of the position of detection of the objects, so that objects of said particular kind are directed in a first direction and other objects are directed in another direction, and wherein the movement of the separating member after detection of an object is controlled in dependence on a physical dimension of the detected object.

In one such method a time of movement of the separating member after detection of an object is controlled in dependence on said physical dimension.

In another particular method in accordance with the invention detection of the objects is effected by determining the attenuation of a beam of radiation as the objects interrupt the beam and movement of said separating member after detection of an object is controlled in dependence on said physical dimension of that object in conjunction with the degree of attenuation of said beam of radiation by that object.

In one such method the separating member is moved only when the attenuation of said beam of radiation has a predetermined relation with respect to a threshold value, which threshold value depends in turn on said physical dimension.

Several separating apparatuses and methods in accordance with the invention will now be described by way of example with reference to the accompanying drawings in which.

The apparatus is intended for use in separating stones, clods of earth and other unwanted objects from potatoes during harvesting.

Figure 1:
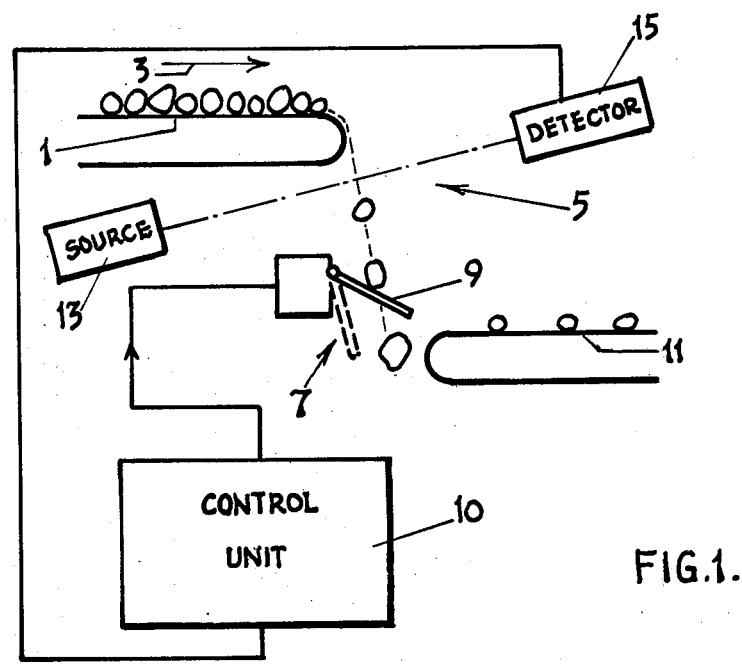
FIG. 1 is a diagrammatic view illustrating the general form of the apparatus.

Referring to FIG. 1, the harvested potatoes together with the unwanted objects are fed to the separating apparatus on a conveyor 1 travelling in the direction of the arrow 3, the harvested material having previously been spread out on the conveyor 1 so that the potatoes and stones etc. lie side by side on the conveyor 1. On reaching the end of the conveyor 1 the potatoes and stones fall under gravity through a sensing device 5 and subsequently through a separating mechanism 7. The separating mechanism 7 includes a pivoted finger 9 which is normally positioned in a first position (shown in full lines in FIG. 1) so as to deflect the falling objects onto a second conveyor 11 travelling in the same direction as the conveyor 1. In response to the detection of an unwanted object by the sensing device 5 the finger 9 is temporarily moved downwardly under control of a unit 10 to a second position (shown dotted in FIG. 1) so as to allow the detected unwanted object to fall onto the ground instead of being deflected onto the conveyor 11.

The separating mechanism 7 is typically a pneumatic mechanism, the control unit 10 producing electrical signals which operate valves in the mechanism which control the supply of compressed air to the mechanism to cause the required movements of the finger 9.

The sensing device 5 essentially comprises a source 13 which directs a beam of X-rays onto a detector 15. The falling objects interrupt the X-ray beam, and due to the fact that X-rays are attenuated less by potatoes than by unwanted material, the output of the detector 15 indicates when an unwanted object is interrupting the X-ray beam.

It will be appreciated that in the drawing a single sensing device 5 and separating mechanism 7 only are shown, for simplicity. In a practical arrangement a number of separating mechanisms are provided whose fingers are disposed in close spaced relation across the width of the conveyor 1, and a number of sensing devices are provided whose sensors are similarly spaced across the width of the conveyor 1. The X-ray beams for the sensors are typically derived from a common source and each sensor may be arranged to control one or more fingers. In a typical arrangement the sensors are positioned so as to appear to lie between the fingers when viewed vertically and each sensor controls the fingers on either side of it.

The manner in which the unit 10 controls the associated separating mechanism 7 in response to the output of the sensing device 5 will now be described.

The X-ray source 13 produces pulses of X-rays at a suitable repetition rate, typically 300 pulses per second. The detector 15 is arranged to produce output pulses at the same rate when the strength of the X-ray pulses impinging on it are below a threshold value such that the detector 15 produces output pulses only when an unwanted object is interrupting the X-ray beam directed on to it. However, as further explained below, special arrangements may be required to cope with potatoes large enough to attenuate the X-ray beam as much as small unwanted objects.

In response to output pulses from the detector 15 the unit 10 causes the finger 9 to drop down when an unwanted object is detected by the detector 15, and to remain down unit the object has fallen clear of the bottom of the finger. The time which elapses between the first output pulse produced by the detector 15 and the dropping of the finger 9 is hereafter referred to as the drop delay and the time which the finger 9 remains in its dropped (second) position is hereafter referred to as the dwell time.

The drop delay is of course required in order to prevent the finger 9 moving down too soon and so allow potatoes just ahead of the unwanted object to fall to the ground. The dwell time is of course required to allow unwanted objects to fall clear of the finger 9 before the finger is returned to its first position.

The means producing the drop delay preferably comprises a number of series-connected delay stages to enable unwanted objects interrupting the beam in succession at intervals less than the drop delay to each cause a separate operation of the finger 9.

In accordance with the present invention, in order to enable the apparatus to operate successfully with unwanted objects of different sizes, the unit 10 controls the dwell time of the finger 9 in dependence on the size of the unwanted objects in the direction in which the objects fall so that the larger the object the longer the dwell time.

It will be appreciated in this connection that since the output of detector 15 in respect of an unwanted object comprises pulses at the pulse repetition rate of the source 13 for the period which that object interrupts the X-ray beam, the number of pulses in the output of the detector 15 in respect of an object represents the dimension of that object in the direction in which the objects fall.

With prior art arrangements the dwell time has a fixed value, and it is found that when the dwell time has a value large enough to allow large unwanted objects to fall to the ground, then the finger 9 does not return to its first position quickly enough to prevent a potato following a small stone from falling to the ground. Alternatively the finger tends to strike the top of larger unwanted objects when returning to its normal position.

In accordance with the invention, in addition to or alternatively to controlling the dwell time of the finger 9 the unit 10 may control the drop delay of the finger 9 in dependence on the size of the unwanted objects.

Thus the drop delay may be varied so that the finger 9 drops down slightly sooner after detection of a small unwanted object than after detection of a large unwanted object. This may be desirable since large objects follow a path slightly to the right in FIG. 1 of the path followed by small objects, and hence, due to the disposition of the X-ray beam and the finger 9 when in its normal position large objects arrive at the finger 9 a longer time after detection by the sensing device 5 than small objects. With appropriate control of the drop delay in conjunction with the dwell time, the period for which the finger 9 remains down to allow an unwanted object to fall to the ground can be kept to the minimum consistent with the size of that object, thus reducing the possibility of potatoes falling to the ground.

It is pointed out that the present invention is applicable to sorting apparatus of different geometry to that shown in FIG. 1, and that the control of the times of movement of the finger 9 in dependence on the size of unwanted objects will depend on the geometry of the apparatus.

Figure 2:
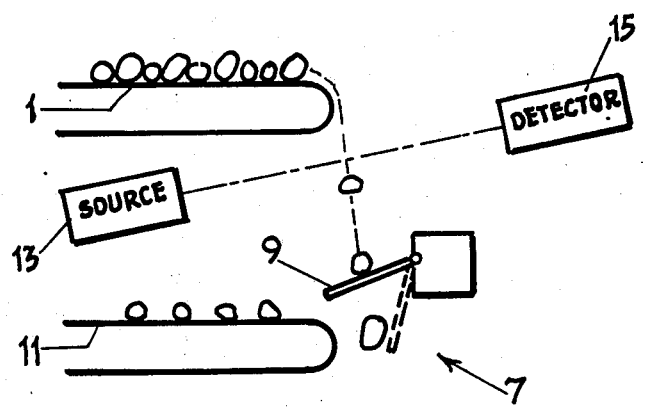
FIG. 2 illustrates a possible alternative general form of the apparatus.

One such alternative geometry where the finger 9 causes the potatoes to be deflected in a direction opposite to their direction of travel on the conveyor 1 and the conveyor 11 travels in the opposite direction to the conveyor 1 is shown in FIG. 2. In this arrangement larger objects clearly reach the finger 9 a shorter time after detection than smaller objects so that the drop delay might usefully be controlled in dependence on the size of unwanted objects in the opposite sense to that described above with reference to FIG. 1.

In accordance with the invention, in addition to or alternatively to controlling times of movement of the finger 9 in dependence on a physical dimension of detected objects, the decision as to whether or not movement of the finger 9 should occur at all may be controlled by the unit 10 in dependence on a physical dimension of detected objects in conjunction with the strength of the X-rays received by the sensor 15. Thus, the finger 9 may be prevented from dropping for objects having a said physical dimension greater than a predetermined value unless the strength of the X-rays impinging on the detector 15 when that object interrupts the X-ray beam, is lower than a second threshold value below the above-mentioned normal threshold value. The normal threshold is set, as before, at a value high enough to detect the smallest unwanted object; the second threshold is set at a value just low enough not to detect the largest potato, and the predetermined value of the physical dimension is set at a value between the dimension of the smallest potato which reduces the strength of the X-rays impinging on the sensor below the normal threshold and the dimension of the smallest unwanted object which will reduce the strength of X-rays at the detector 15 below the second threshold level. The finger 9 is then prevented from dropping for large potatoes which attenuate the X-rays as much or more than the smallest unwanted objects, since such potatoes will necessarily have a said physical dimension larger than said predetermined value, but will not reduce the strength of the X-rays at the sensor 15 below the second threshold value.

This may be implemented by arranging the detector 15 so that it produces pulses at a second output only when the strength of the X-ray pulses impinging on it are below the second, lower, threshold value, and preventing the finger 9 from dropping when the dimension of a detected object is greater than said predetermined value, unless an output is present at the second output of the detector 15. The desired prevention of movement of the finger 9 may be achieved by reducing the dwell time to zero, or in any other suitable manner.

Figure 3:
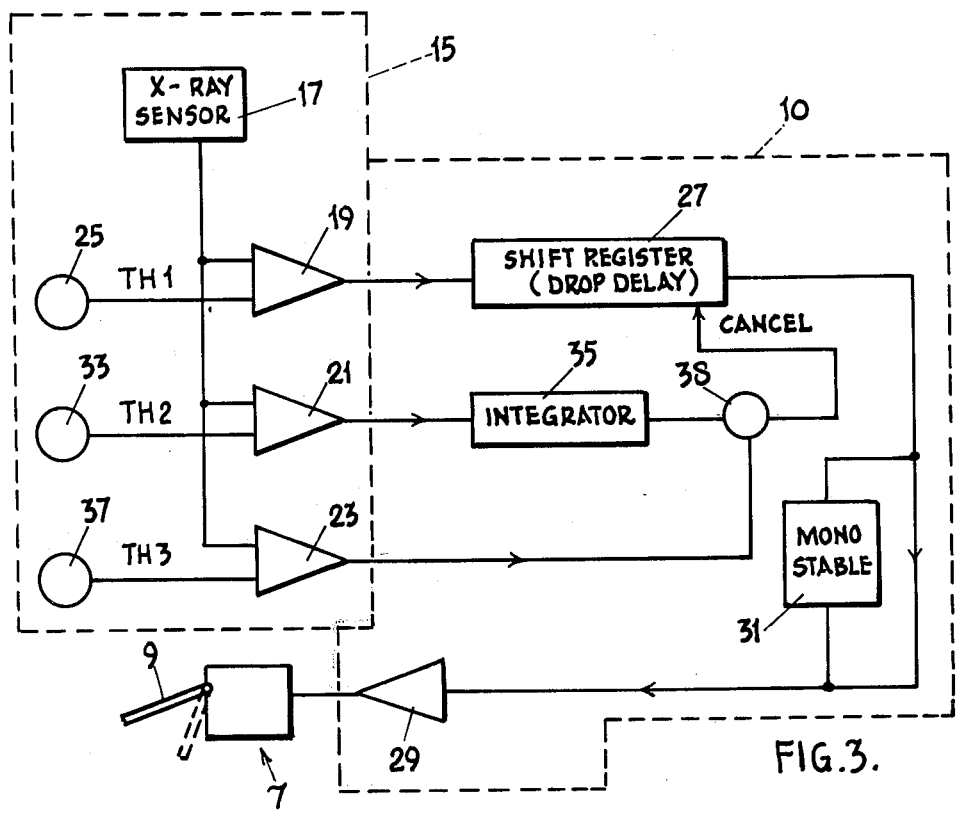
FIG. 3 is a block schematic diagram of one embodiment of a control unit forming part of the apparatus of FIG. 1 or 2.

FIG. 3 shows a suitable form of the control unit 10 and detector 15 for use when it is required to control dwell time in dependence on the dimension of the unwanted objects in the direction in which the objects fall, and to prevent the finger 9 dropping for large potatoes which attenuate the X-rays received by detector 15 as much or more than the smallest unwanted objects. Thus the control unit of FIG. 3 does not vary drop delay.

Referring to FIG. 3, in this arrangement the detector 15 includes an X-ray sensor 17 which produces an output signal whose magnitude varies with and in the same sense as the strength of the X-ray beam reaching it from the source 13 (not shown in FIG. 3). Thus the output of the sensor 17 comprises pulses at the pulse repetition rate of the X-ray source 13 of an amplitude dependent on the X-ray attenuation of objects interrupting the X-ray beam.

The output of the sensor 17 is applied to one input of each of three voltage comparators 19, 21 and 23.

From a source 25 a reference voltage TH1 is applied to a second input of the comparator 19. The comparator 19 produces an output of a given amplitude when its input from the sensor 17 is lower than its reference input TH1, and the reference input has a value just greater than the output of sensor 17 when the smallest unwanted object interrupts the X-ray beam directed onto sensor 17. Thus the comparator 19 produces output pulses of uniform amplitude corresponding to the pulses produced by source 13 whenever an unwanted object interrupts the X-ray beam.

The output of the comparator 19 is applied to a shift register 27 which is clocked continuously at the pulse repetition rate of the X-ray source 13. Thus, after a fixed delay determined by its number of stages, the register 27 produces in response to each unwanted object an output pulse of a duration equal to the time for which the unwanted object interrupts the X-ray beam. Hence the duration of the output pulses of the register 27 vary with and in the same sense as the dimensions of the objects in the direction in which they fall.

The output of the register 27 operates the finger 9 by way of a power amplifier 29, so that the finger 9 is dropped for the duration of each register output pulse. The register output further triggers a monostable circuit 31 whose output also operates the finger 9 by way of amplifier 29 so that finger 9 remains dropped for at least a minimum period set by the monostable 31 for each output pulse of the register 27.

Thus the finger 9 is dropped in response to the detection of each unwanted object for a dwell time determined by the dimension of the detected object after a fixed drop delay determined by the number of stages in the register 27.

The two comparators 21 and 23 are used in preventing the finger 9 from dropping for potatoes large enough to attenuate the X-rays reaching sensor 17 as much as the smallest unwanted objects, i.e. sufficiently to produce pulses at the output of comparator 19.

From a source 33 a reference voltage TH2 is applied to a second input of comparator 21, the voltage TH2 having a relatively high value compared with TH1 so that the comparator 21 produces output pulses for virtually any object which interrupts the X-ray beam. The output of the comparator 21 is applied to an integrator 35 which integrates the pulses produced for each object at the output of comparator 21 and produces an output when the integral for any one object exceeds a predetermined value as further explained below.

From a source 37 a reference voltage TH3 is applied to a second input of the comparator 23, the voltage TH3 having a low value compared with TH1 so that the comparator 23 will produce output pulses only for objects which attenuate the X-ray beam more than the largest potato.

The above-mentioned predetermined value is set so that the integrator 35 produces an output only if an object has a dimension in the direction of falling larger than a value between that of the smallest unwanted object which produces pulses at the output of comparator 23 and that of the smallest potato which produces pulses at the output of comparator 19.

The output of integrator 35 is used to prevent the register 27 producing an output, and hence to prevent the finger 9 dropping, unless the comparator 23 produces an output. To this end the output of comparator 23 is utilized to inhibit a gate 38 by way of which the output of integrator 35 is supplied to register 27. Thus the finger 9 is prevented from dropping for large potatoes which attenuate the X-rays sufficiently to produce pulses at the output of comparator 19, since such potatoes have a dimension larger than that corresponding to said predetermined value and so cause integrator 35 to produce an output, but will not reduce the output of detector 17 below the voltage TH3 and so cause comparator 23 to produce an output. Furthermore all unwanted objects large enough to cause integrator 35 to produce an output must also cause comparator 23 to produce an output so that the finger 9 will drop for such unwanted objects.

Figure 4:
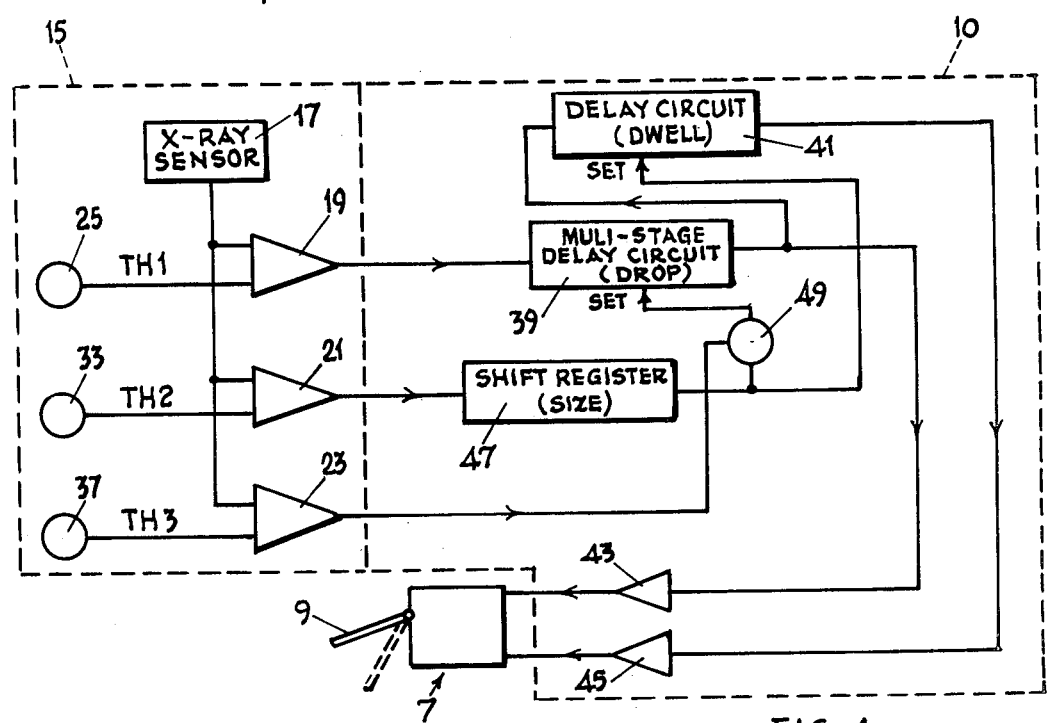
FIG. 4 is a block schematic diagram of second embodiment of the control unit.

FIG. 4 shows a suitable form of the control unit 10 and sensor 15 for use when it is required to control drop delay as well as dwell time in dependence on the dimension of the unwanted objects.

Referring to FIG. 4, the detector 15 is the same as that shown in FIG. 3 and will not be described further.

The output of the comparator 19 of detector 15 is utilised to trigger a multi-stage delay circuit 39, which typically comprises three series-connected monostable circuits and the output of the delay circuit 39 is utilised to trigger a further delay circuit 41. The finger 9 is operated by the outputs of the delay circuits 39 and 41 by way of power amplifiers 43 and 45 respectively so that the finger drops down from its first position to its second position in response to an output from delay circuit 39 and returns to its first position in response to an output from delay circuit 41. Thus delay circuits 39 and 41 determine drop delay and dwell time respectively.

To control drop delay and dwell time with object size the output of comparator 21 is applied to a storage means comprising a shift register 47 which stores the output pulses produced by comparator 21 for each object. At appropriate times the shift register 47 is read out and the delay periods of circuits 39 and 41 are set accordingly. The delay circuits 39 and 41 are suitably arranged to provide a fixed delay for objects less than a certain size.

The finger 9 is prevented from dropping for large potatoes which attenuate the X-rays received by detector 15 as much or more than the smallest unwanted objects, in a similar manner to that described above with reference to FIG. 3. Thus the delay circuit 39 is prevented from producing an output if the read-out of register 47 indicates an object having a dimension greater than a predetermined value, chosen as described above, unless the comparator 23 produces an output, indicating that the object is an unwanted object. To this end the output of comparator 23 is utilized to inhibit a gate 49 by way of which the output of register 47 is applied to delay circuit 39.

It will be appreciated that in the arrangement of FIG. 4 precise object dimension data is derived from the X-rays falling on the detector 15 giving a greater degree of control finger operation than in the FIG. 3 arrangement. In alternative embodiments of the invention precise data regarding attenuation of the X-rays falling on the detector 15 may also be obtained and the attenuation and dimension data processed by digital or analogue methods to obtain an even greater degree of control of finger operation.

I claim:

1. An apparatus for separating objects of a particular kind from a stream of falling objects comprising:

sensing means comprising a radiation sensor and a source of radiation arranged to direct a beam of said radiation onto said sensor, which beam is interrupted by the falling objects, so that objects of said particular kind are detected because they consist of a material that attenuates said radiation differently from the material of the other objects;

a separating mechanism including at least one movable separating member which is positioned downstream of said sensing means along the path of the falling objects;

and control means for controlling said separating mechanism in response to the output of said sensing means so that after detection of an object by said sensing means said separating member is moved with respect to the path of the falling objects so that objects of said particular kind are directed in a first direction and other objects are directed in another direction;

and including the improvement that the sensing means produces an output representative of a physical dimension of each detected object, and the control means controls said separating mechanism after detection of an object by the sensing means so that said separating member is moved only when the strength of the radiation received by said sensor when that object interrupts said beam of radiation has a predetermined relation with respect to a threshold value, which threshold value depends on the said physical dimension of that object.

2. An apparatus according to claim 1 wherein said control means includes: means for temporarily moving said separating member to a second position from a first position when the strength of the received radiation is below a first threshold value substantially equal to the received radiation strength when the smallest likely object of said particular kind is interrupting the beam; and means for preventing such movement of said separating means when said dimension of the object interrupting the beam exceeds a predetermined value unless the strength of the received radiation is below a second threshold value substantially equal to the received radiation strength when the largest likely said other object is interrupting the beam; said particular value lying between the dimension of the smallest object of said particular kind which reduces the strength of received radiation below said second threshold value and the dimension of the smallest other object which reduces the strength of the received radiation below said first threshold value.

3. An apparatus according to claim 2 wherein said sensing means produces an output for a period dependent on said dimension of each detected object and said means for preventing said movement of the separating member includes an integrator for integrating said sensing means output and means for preventing said movement when the output of said integrator exceeds a predetermined value.

4. An apparatus for separating objects of a particular kind from a stream of falling objects comprising:

sensing means for detecting objects of said particular kind in a stream of falling objects;

a separating mechanism including at least one solid separating member which is located downstream of said sensing means and which is movable between a first position in the path of the falling objects where it is struck by, so as to deflect, the falling objects in a first direction and a second position substantially out of the path of the falling objects in which the falling objects are free to fall in another direction; and control means for controlling said separating mechanism in response to the output of said sensing means so that said separating member is temporarily moved from its first position to its second position after detection of an object by the sensing means, and including the improvement that the sensing means produces an output representative of a physical dimension of each detected object, and the control means controls a time of movement of the separating member between its deflecting first position and its free fall second position after detection of an object by the sensing means in dependence on said physical dimension, said control means controlling said separating mechanism so that the time which elapses between detection of an object by the sensing means and movement of the separating member to its second position is varied in dependence on said physical dimension.

5. An apparatus according to claim 4 wherein said control means includes a variable delay circuit which for each detected object determines the time which elapses between detection of an object and movement of the separating member to its second position; and storage means for storing a representation of said dimension for each detected object, the delay of said variable delay circuit being set in dependence on the value of said dimension stored in said storage means.

6. An apparatus according to claim 5 wherein the sensing means supplies to the storage means a train of pulses for a period dependent on said dimension of each detected object, and said storage means comprises a shift register clocked at the repetition frequency of said train of pulses.

7. An apparatus for separating objects of a particular kind from a stream of falling objects comprising:

sensing means for detecting objects of said particular kind in a stream of falling objects;

a separating mechanism including at least one solid separating member which is located downstream of said sensing means and which is movable between a first position in the path of the falling objects where it is struck by so as to deflect the falling objects in a first direction and a second position substantially out of the path of the falling objects in which the falling objects are free to fall in another direction; and control means for controlling said separating mechanism in response to the output of said sensing means so that said separating member is temporarily moved from its first position to its second position after detection of an object by the sensing means, and including the improvement that the sensing means produces an output representative of a physical dimension of each detected object, and the control means controls a time of movement of the separating member between its deflecting first position and its free fall second position after detection of an object by the sensing means in dependence on said physical dimension, the output of the sensing means being for a period dependent on said dimension of the detected object, and, at least for larger detected objects, said control means controlling said separating mechanism so that said separating member remains in its second position for a time dependent on the period of said output of the sensing means, said control means including a delay circuit responsive to the output of the sensing means which determines the time which elapses between detection of an object and movement of the separating member to its second position as a function of said dimension of the object.

8. An apparatus according to claim 7 wherein said output of the sensing means comprises a train of pulses, and said delay circuit comprises a shift register clocked at the repetition frequency of said pulse train.

9. An apparatus for separating objects of a particular kind from a stream of falling objects comprising:

sensing means for detecting objects of said particular kind in a stream of falling objects;

a separating mechanism including at least one solid separating member which is located downstream of said sensing means and which is movable between a first position in the path of the falling objects where it is struck by, so as to deflect, the falling objects in a first direction and a second position substantially out of the path of the falling objects in which the falling objects are free to fall in another direction; and control means for controlling said separating mechanism in response to the output of said sensing means so that said separating member is temporarily moved from its first position to its second position after detection of an object by the sensing means, and including the improvement that the sensing means produces an output representative of a physical dimension of each detected object, and the control means controls a time of movement of the separating member between its deflecting first position and its free fall second position after detection of an object by the sensing means in dependence on said physical dimension, said control means controlling said separating mechanism so that the time for which the separating member remains in its second position after detection of an object by the sensing means is varied in the same sense as said physical dimension, said control means including a variable delay circuit which for each detected object determines the time for which the separating member remains in its second position and storage means for storing a representation of said dimension of each detected object, the delay of said variable delay circuit being set in dependence on the value of said dimension stored in said storage means, and the sensing means supplying to the storage means a train of pulses for a period dependent on said dimension of each detected object, and said storage means comprising a shift register clocked a repetition frequency of said train of pulses.

10. A method of separating objects of a particular kind from a stream of falling objects comprising:

detecting objects of said particular kind in said stream;

after detection of an object, temporarily moving a solid separating member located downstream of the position of detection of the objects, from a first position in the path of the falling objects where it is struck by and deflects the falling objects in a first direction, to a second position substantially out of the path of the falling objects in which the falling objects are free to fall in another direction, and including the improvement that a time of movement of the separating member between its deflecting first position and its free fall second position after detection of an object is controlled in dependence on a physical dimension of the detected object, the time which elapses between detection of an object and movement of the separating member to its second position being varied in dependence on said physical dimension.

11. A method of separating objects of a particular kind from a stream of falling objects comprising:

detecting objects of said particular kind by determining the attenuation of a beam of radiation as the objects interrupt said beam; and after detection of an object, moving a separating member positioned along the path of the falling objects, downstream of the position of detection of the objects, so that objects of said particular kind are directed in a first direction and other objects are directed in another direction;

and including the improvement that said separating member is moved after detection of an object only when the attenuation of said beam of radiation by that object has a predetermined relation with respect to a threshhold value, which threshhold value depends in turn on a physical dimension of that object.

* * * * *